D. H. GALBRAITH.
HEADLIGHT.
APPLICATION FILED MAY 11, 1918.

1,367,315.

Patented Feb. 1, 1921.
2 SHEETS—SHEET 1.

Inventor:
Daniel H. Galbraith,
By his Attorney

D. H. GALBRAITH.
HEADLIGHT.
APPLICATION FILED MAY 11, 1918.

1,367,315.

Patented Feb. 1, 1921.

2 SHEETS—SHEET 2.

Inventor:
Daniel H Galbraith,

By his Attorney

UNITED STATES PATENT OFFICE.

DANIEL HENRY GALBRAITH, OF CLEVELAND, OHIO, ASSIGNOR TO THE ADAMS-BAGNALL ELECTRIC COMPANY, OF CLEVELAND, OHIO, A CORPORATION OF OHIO.

HEADLIGHT.

1,367,315.  Specification of Letters Patent.  Patented Feb. 1, 1921.

Application filed May 11, 1918. Serial No. 233,927.

*To all whom it may concern:*

Be it known that I, DANIEL H. GALBRAITH, a citizen of the United States, residing at Cleveland, in the county of Cuyahoga and State of Ohio, have invented certain new and useful Improvements in Headlights, of which the following is a specification.

This invention relates to headlights, more particularly however to that class of headlights adapted for use on motor vehicles, such for instance as automobiles, it particularly relating however to that style of headlight in which the reflector is pivoted for swinging movement in a vertical plane, so that it can be shifted from a horizontal or its normal position to throw the light downwardly thereby to prevent the dangerous glare of the light, the object of the present improvement being to provide this style of headlight with improved means for supporting the reflector, and improved means for operating it, all of which improvements permit the use of a very simple and efficient mechanical operating means.

In short, the object of the present improvement is to provide a commercially practical headlight in which the reflectors of both lamps will be efficiently supported and mechanically operated by a flexibly controlled means from the seat of the car.

The object of the present invention is therefore to utilize the ordinary reflector itself to do away with the dangerous glare, and thus eliminate the necessity of using independent devices such as deflectors, shades and masks and to do this by providing a very simple means for supporting and for shifting the reflector.

Figure 1:
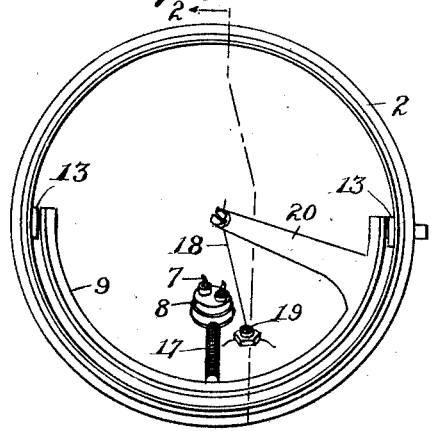
Figure 2:
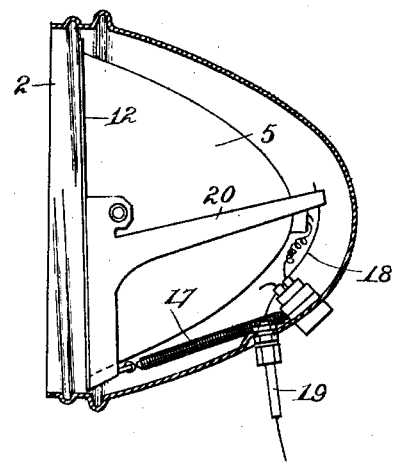
Figure 3:
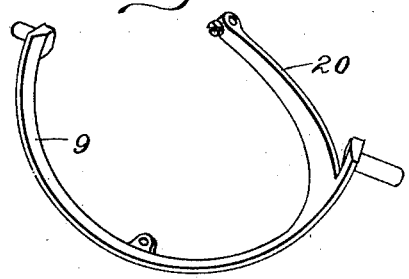
Figure 4:
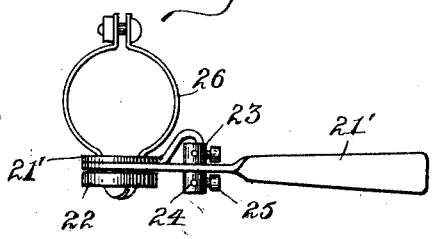
Figures 5, 6:
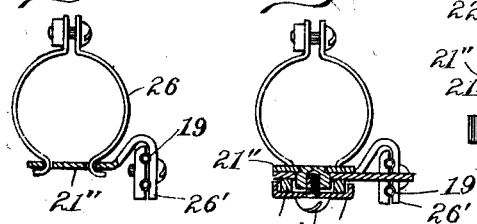
Figure 7:
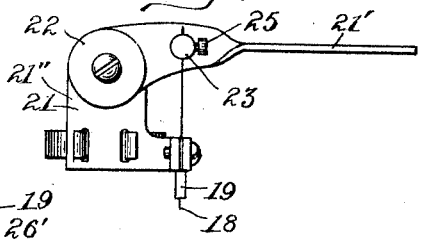
Figure 8:
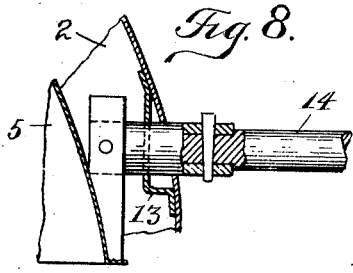
Figure 9:
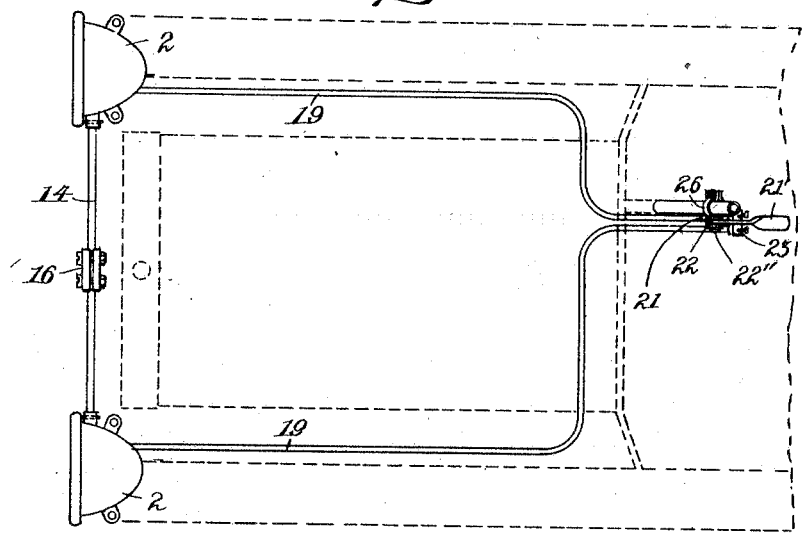
Figure 10:
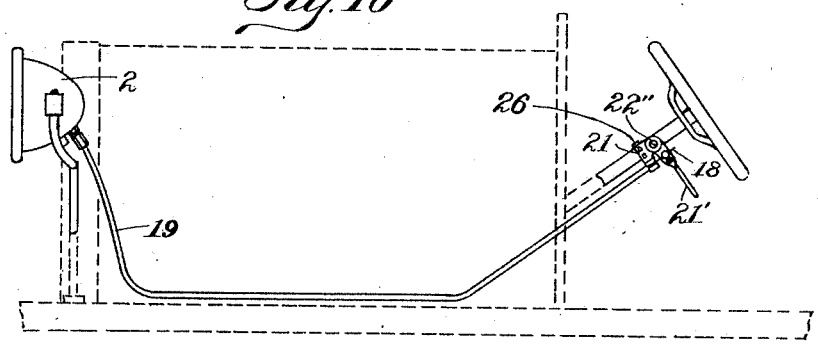
Figure 11:
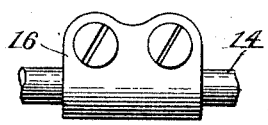
Figure 12:
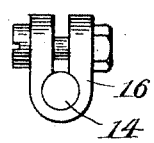

In the drawings accompanying and forming a part of this specification, Figure 1 is a front interior view of this improved lamp; Fig. 2 is a cross sectional view taken on line 2—2 Fig. 1; Fig. 3 is a detail view of the reflector supporting means; Figs. 4, 5, 6, and 7 are views illustrating the lever device for operating the flexible means connected with the reflector and thereby the reflector; Fig. 8 is a detail partly sectional view illustrating the connection between the connecting rod and one of the reflector pivots; Fig. 9 is a top view;—and Fig. 10 a side view illustrating the lamps in position on an automobile; and Figs. 11, 12, 13, and 14 are detail views illustrating the means of securing the meeting ends of the connecting rod together.

Similar characters of reference indicate corresponding parts in the several figures of the drawings.

In the preferred form thereof herein shown and described, each lamp of the pair comprises a casing 2, which is of the usual conventional form having a removable lens or glass and suitable ears for attachment to the usual stationary fork of the bracket. In each lamp casing is supported for shiftable movement a parabolic reflector 5, carrying the usual light or bulb which is connected with a source of electrical energy by the usual connecting cable 7 running to an Ediswan connector 8, carried by the lamp casing. Located at the forward end of the casing in the rear of the lens or front glass and in such proximity to the inner side of the glass as will permit the proper movement of the reflector is a rigid semi-circular or half ring 9 preferably in the form of a casting to which the forward or front end of the reflector is connected. It is essential that this semi-circular or half ring be made extremely rigid and therefore it is found desirable to make it in the form of a casting so that it will retain the shape of the reflector and prevent it from flexing, which is not always possible if this supporting ring is made of flexible material, such as sheet metal. This rigid half ring is provided at opposite sides with relatively long projecting pivots by means of which the half ring and thereby the reflector are pivotally connected with the lamp casing, the pivot at the inner side of the lamp when placed on the car extending through the casing in certain instances as hereinafter described. For connecting the reflector to the half ring the forward or front edge of the reflector is provided with an outwardly extending or right angled flange 12 overlapping the forward edge of the half ring and to which this flange may be secured in any suitable way as by means of screws not shown.

In the present improvement the pivots of the half ring are carried by brackets 13 secured to the inner walls of the lamp casing, and it will be noted that the pivots of the half ring are thus located near the front of the lamp casing and that the half ring is also located at the front of the reflector so that this half ring acts as a stiffening member and materially stiffens the front end of the reflector and so prevents distortion thereof in its shiftable movements.

Figure 13:
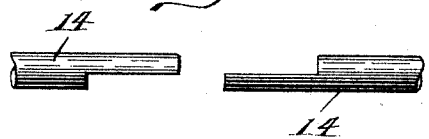
Figure 14:
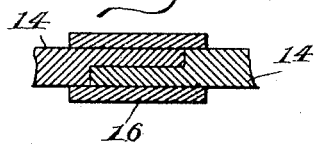

In one form of the improvement the reflectors may be connected together by a connecting rod 14 so that when one of the reflectors is shifted by its shifting means both will be simultaneously operated. In this form of the improvement the connecting rod may be coupled to a pivot of each reflector in the manner shown in Fig. 8, in which the pivot at its end is formed U-shaped for the reception of a flat sided end of the rod, a cotter pin or other suitable means being passed through the so assembled parts to efficiently connect them. When the rod is used it is preferably formed in two parts to permit the proper assemblage, and these two parts may be rabbeted or stepped as illustrated in Figs. 13 and 14 at 15 and clamped together by a clamp 16, such as that shown in Figs. 11 and 12. Other ways of connecting these two rods may of course be used, it being necessary however, to use some efficient connecting means that will permit the two reflectors to be shifted simultaneously and not one independently of the other. When the reflectors are connected by the connecting rod just described, a single flexible shifting means is used leading from the steering post, for instance, to one of the reflectors, and the operation of which thereby operates both reflectors. However, it has been found that the same result can be obtained by doing away with the connecting rod and shifting the reflectors simultaneously by a pair of flexible means, or the connecting rod can be used and the pair of flexible shifting means also used as will be found preferable in practice. A spring 17 is secured to the stiffening half ring at one point and to the casing or to the Ediswan connector socket as found most desirable, and this spring serves to maintain the reflector in such position that the glare of the light will be shifted downwardly. For shifting the reflectors a flexible cable 18 is provided, this cable consisting of a metallic casing 19 with a wire therein. One end of the wire is secured to an arm 20 connected to or formed as a part of the half ring, and this arm is sufficiently long to lead to the rear or adjacent to the apex of the parabolic reflector, and at this point the cable is connected to the arm. This arm or lever gives a better leverage in shifting the reflector, it being rigidly secured to the stiffening member adjacent to one of the pivots thereof. The end of the cable casing is rigidly connected to the lamp casing at a convenient point, while the cable passes from its casing to the arm of the half ring. The connection of the cable casing to the lamp casing is a very rigid one, so as to prevent any lengthwise movement of the cable casing. The opposite end of the cable casing leads in the present instance to the steering post where it is rigidly connected to the handle or lever bracket 21, so that movement of the casing at this end is prevented. From this end of the casing the cable leads to the operating lever 21'. When two cables are used, one for each lamp, the lever bracket is so formed that each cable casing will have its end rigidly clamped thereto while both cables will lead to and be secured to the operating lever. The lever bracket comprises a plate 21'' to which the lever is pivotally mounted, it being frictionally held in place by a cupped washer 22 carrying a split washer 22' both secured in position by a screw 22'' and in the rear of this pivotal connection the lever is provided with a rotatable or oscillating stud 23 passing through an opening in the lever and provided with a pair of holes 24 for the reception of the ends of the cables, the cables being secured therein by suitable set screws 25. The bracket plate is provided with a split clamp 26 adapted to be attached to the steering post, and this bracket plate is also provided with a clamp 26' for the reception of the two ends of the cable casing, and as the cable casings are of flexible metal they may be bent into any desirable position in assembling the structure on the car, so that they may be almost entirely out of sight. The oscillatory stud hereinbefore referred to is in the nature of a rocking bearing, so that it adjusts itself during the movement of the lever thereby to maintain the projecting portions of the cable relatively straight during their movement toward and from the cable casing. The swinging or split clamp rings 26 carried by the bracket enable the bracket and its lever to be attached to different diameters of steering posts. In the present improvement the organization is such that the kinking or bending of the wire or cable within the lamp casing or between the connection of the cable casing to the lever bracket and the lever is entirely prevented. As hereinbefore set forth, when it is desired to operate both reflectors by a single flexible cable the connecting rod hereinbefore described is used. If however, it is desired to operate both reflectors by a pair of flexible cables, then each lamp is separately connected by means of a flexible cable with the lever, or as hereinbefore stated, if preferred, this same mode of connection may also be used together with the connecting rod. Whichever means of operation is used both lamp reflectors are shifted simultaneously, so that the light may be more directly thrown on to the road and the glare thereof prevented.

As hereinbefore stated, the stiffening or reinforcing member to which the reflector is connected is in the form of a casting and consequently because of this rigid construction it need only extend substantially half way around the reflector since owing to its rigid construction the reflector will be prevented from flexing and be retained in its proper shape, thus this half-formed ring gives all the rigidity necessary to the reflector without increasing the weight thereof and the consequent difficulty of moving it, which would be the case if this casting were so made as to extend entirely around the reflector. Both reflectors must be shifted simultaneously and consequently the added weight to each of the reflectors, if the casting were formed as a ring, would materially increase the frictional resistance of the operating wires in their casings whereas by reason of the construction of the reinforcing members this added weight is done away with and consequently the frictional resistance of the operating wires is materially decreased while still providing a structure which will maintain the reflector in proper shape during its movements. Moreover, the provision of this stiffening ring enables the lever or operating arm to be rigidly secured to a substantially constructed part, to wit: the cast reinforcing or stiffening member, which thus receives all the strain of such operating arm and does not impart it to the sheet metal formed reflector.

If the lever were connected to the reflector itself or to a pivot thereof, its tendency would be to flex or force the reflector somewhat out of shape during the movements of the reflector. By extending this operating arm or lever toward the rear and terminating it adjacent to the apex of the reflector makes it possible to lead the operating wire into the bottom of the casing where it is out of sight and enables this wire to extend from the point where it enters the casing in almost a straight line to the end of the lever and also enables the wire between the point where it enters the casing and its connection with the lever to be comparatively short, thus doing away with any chance of its flexing or buckling.

Without this operating arm the wire would have to be connected to the reflector in some manner at its forward edge and lead from the casing at the rear thereof, which would require quite a long length of wire between the reflector and the casing, but by the provision of this lever located in the manner stated, the lamps are not only more easily and efficiently operated but there is less frictional resistance between the wire and its casing, since the long lever requires but little force to operate it and as the lever, as stated, is rigidly connected with the cast reinforcing member adjacent to the pivot thereof, there is no tendency to deflect or force the reflector out of shape, as would be the case where the push or pull of the operating wire is on the sheet metal light weight reflector itself.

In other words, the pull and push on the lever from the point where the wire enters the casing is in almost a straight line at this end and at the opposite end where the wire is connected with the operating lever in the car the construction is also such that a straight line movement is practically given to the wire, so that from the actuating wire in the car to the reflecting operating lever there is no chance for the wire to buckle or to interfere with the efficient operation of the reflector and the frictional resistance of the wire in its casing is materially reduced while the reflector is maintained in its shape by a cast iron partially formed ring without any undue weight being added to the reflector to interfere with its free and easy movement.

I claim as my invention:

1. The combination of a lamp casing, a parabolic reflector therein, a reinforcing member rigidly secured to said reflector at the forward edge thereof and pivotally secured at opposite sides to said casing, said member having a lever located adjacent to one of said pivots and extending therefrom to the rear of the reflector, a wire secured to said lever, a wire casing rigidly secured at one end to the lamp casing and through which said wire extends, a lever located within the vehicle and to which the other end of said wire is connected, and a clamp to which said lever is connected and to which the opposite end of the wire casing is also rigidly secured, said wire being operative by reason of the rigid connection of the wire casing at its opposite ends to shift the reflector in opposite directions.

2. The combination of a lamp casing, a parabolic reflector therein, a reinforcing member rigidly secured to said reflector partially around the forward edge thereof and pivotally secured at opposite sides to said casing, said member having a lever located adjacent to one of said pivots and extending therefrom to the rear of the reflector, a wire secured to said lever, a wire casing rigidly secured at one end to the lamp casing and through which said wire extends, a lever located within the vehicle and to which the other end of said wire is connected, and a clamp to which said lever is connected and to which the opposite end of the wire casing is also rigidly secured, said wire being operative by reason of the rigid connection of the wire casing at its opposite ends to shift the reflector in opposite directions.

3. The combination of a pair of independent lamp casings, a pair of reflectors therein, a reinforcing member secured to each reflector at the front edge thereof and pivotally secured at opposite sides to said casing, said member having a lever located adjacent to one of the pivots and extending therefrom to the rear of said reflector, a wire secured to each of said levers, a wire casing rigidly secured at one end to each of said lamp casings and through each of which one of said wires extends, a lever located within the vehicle and to which the other ends of both wires are connected, and a clamp to which the opposite ends of both wire casings are also rigidly secured, both of said wires being simultaneously operative by reason of the rigid connection of the wire casings at their opposite ends to shift both of the reflectors together in opposite directions.

4. The combination of a pair of independent lamp casings, a pair of reflectors therein, a reinforcing member secured to each reflector partially around the front edge thereof and pivotally secured at opposite ends to said casing, said member having a lever located adjacent to one of the pivots and extending therefrom to the rear of said reflector, a wire secured to each of said levers, a wire casing rigidly secured at one end to each of said lamp casings and through each of which one of said wires extends, a lever located within the vehicle and to which the other ends of both wires are connected, and a clamp to which said lever is connected and to which the opposite ends of both wire casings are also rigidly secured, both of said wires being simultaneously operative by reason of the rigid connection of the wire casings at their opposite ends to shift both of the reflectors together in opposite directions.

5. The combination of a casing, a rigid stiffening member therein, horizontal pivots connecting said member at its opposite sides with the casing, a reflector rigidly secured to said member for movement only therewith, a rearwardly extending lever rigidly secured to said member adjacent to one of said pivots and projecting along the side of said reflector toward the rear thereof and having a length substantially coinciding with the depth of the reflector, and flexible connecting means connected with said lever for shifting it and thereby the reflector.

6. The combination of a casing, a rigid stiffening member therein, horizontal pivots connecting said member at its opposite sides with the casing, a reflector rigidly secured to said member for movement only therewith, a rearwardly extending lever rigidly secured to said member adjacent to one of said pivots and projecting along the side of said reflector toward the rear thereof and having a length substantially coinciding with the depth of the reflector, flexible connecting means connected with said lever for shifting it and thereby the reflector, and a spring connected with the bottom of said stiffening member and to a fixed point within the casing for normally holding said member and thereby the reflector in one position.

7. The combination of a casing, a stiffening member therein comprising a half formed ring, horizontal pivots connecting the ends of said ring to the opposite side of the casing, a reflector rigidly secured to said ring for movement only therewith, a rearwardly projecting lever secured adjacent to one end of said ring and one of the pivots and projecting along the side of the reflector toward the rear thereof and having a length substantially coinciding with the depth of the reflector, and means for shifting said lever and thereby the reflector.

8. The combination of a casing, a stiffening member therein comprising a half formed ring, horizontal pivots connecting the ends of said ring to the opposite side of the casing, a reflector rigidly secured to said ring for movement only therewith, a rearwardly projecting lever secured adjacent to one end of said ring and one of the pivots and projecting along the side of the reflector toward the rear thereof and having a length substantially coinciding with the depth of the reflector, and means for shifting said lever and thereby the reflector and comprising a casing inclosed wire connected with said lever.

9. The combination of a pair of lamps, each comprising a casing, a reflector pivotally supported in each casing at opposite sides thereof, a lever connected to each reflector at one side thereof adjacent to one of the pivots for shifting it and extending along the side of the reflector toward the rear thereof and having a length substantially coinciding with the depth of said reflector, and duplicate means connected with said levers for shifting them and thereby the reflectors simultaneously.

10. The combination of a pair of lamps, each comprising a casing, a stiffening member therein, horizontally located pivots connecting said member at opposite sides within the casing, a reflector rigidly secured to said member for movement only therewith, a rearwardly projecting lever secured to said member adjacent to one of said pivots and extending along the side of the reflector toward the rear thereof and having a length substantially coinciding with the depth of said reflector, a wire secured to the end of each of said levers, and means connected with the ends of said wires for shifting the levers and thereby the reflectors simultaneously.

11. The combination of a pair of lamp casings, a tiltable reflector pivotally supported in each of said casings, means for shifting said reflectors and comprising a pair of casing inclosed flexible cables one for each reflector, a bracket secured to a fixed part of the vehicle, a lever pivoted to said bracket, a clamp carried by said bracket, a rocking roller carried by said lever, the casing of each cable having its ends clamped adjacent to a lamp casing and to said bracket clamp, and the ends of each flexible cable projecting beyond its casing and connected to a reflector and to said rocking roller of the lever.

12. The combination of a pair of lamp casings, a stiffening member pivotally connected in each of said lamp casings by horizontal pivots, a reflector rigidly secured to said stiffening member for tilting movement therewith, a rearwardly extending lever secured to each of said stiffening members adjacent to one of said horizontal pivots, means for shifting said reflectors and comprising a pair of casing inclosed wires, one for each reflector, a bracket secured to a fixed part of the vehicle, a single lever pivoted thereto and having a rocking roller, a rigid clamp carried by said bracket, the casings of the wires having their opposite ends rigidly secured adjacent to the lamp casings and to said rigid clamp, and the wires having their opposite ends secured to the levers within the lamp casings and to the rocking roller.

13. The combination of a pair of lamp casings, a reflector pivotally supported in each for tilting movement, means for shifting said reflectors and comprising a pair of casing inclosed flexible cables one for each reflector, a bracket having a pair of adjustable clamp members for attachment to different diameters of steering posts, a lever pivoted to said bracket and having a rocking roller, a clamp rigidly carried by said bracket, the cable casings having their opposite ends rigidly secured adjacent to the lamp casings and to said clamp and the cables having their opposite ends rigidly connected with the reflectors and to said rocking roller.

14. The combination of a casing, a light carrying tilting reflector pivotally supported therein, means for shifting said reflector and comprising a flexible cable connected with the reflector, a casing therefor clamped to said lamp casing, a bracket adapted for attachment to a part of the vehicle, a rigid clamp carried by said bracket and to the opposite end of which the cable casing is rigidly secured, a lever also carried by said bracket and having a rocking roller and to which the opposite end of the cable is secured, said lever being so located and shiftable that the movement of the cable projecting from its casing is in practically a straight line thereby to prevent the buckling of the cable in its movement toward and from its casing.

15. The combination of a casing, a half formed rigid ring pivotally connected to said lamp casing by horizontal pivots, a lever connected to said ring adjacent to one of said pivots and extending toward the rear of the lamp at one side of the reflector, a light carrying tilting reflector rigidly secured to said ring, means for shifting said reflector and comprising a wire connected with said lever, a casing therefor clamped to said lamp casing, a bracket adapted for attachment to a part of the vehicle, a rigid clamp carried by said bracket and to the opposite end of which the wire casing is rigidly secured, a lever also carried by said bracket and having a rocking roller to which the opposite end of the wire is secured, said lever being so located and shiftable that the movement of the wire projecting from its casing is in practically a straight line thereby to prevent the buckling of the wire in its movement toward and from its casing.

16. The combination of a casing, a stiffening member therein, horizontally located pivots connecting said member at opposite sides of the casing, a reflector rigidly secured to said member for movement only therewith, a rearwardly projecting lever secured to said member adjacent to one of said pivots and extending toward the rear of the reflector at one side thereof and having a length substantially coinciding with the depth of said reflector, a bracket, a rigid clamp carried by said bracket, a lever pivotally secured to said bracket and having a rocking roller, and a casing inclosed wire, the casing having its opposite ends secured to said clamp and adjacent to the lamp casing and the wire projecting beyond the ends of its casing and secured to the lever within the lamp casing and to said rocking roller.

Signed at Cleveland, county of Cuyahoga and State of Ohio, this 8th day of May, 1918.

DANIEL HENRY GALBRAITH.